Figure 1:
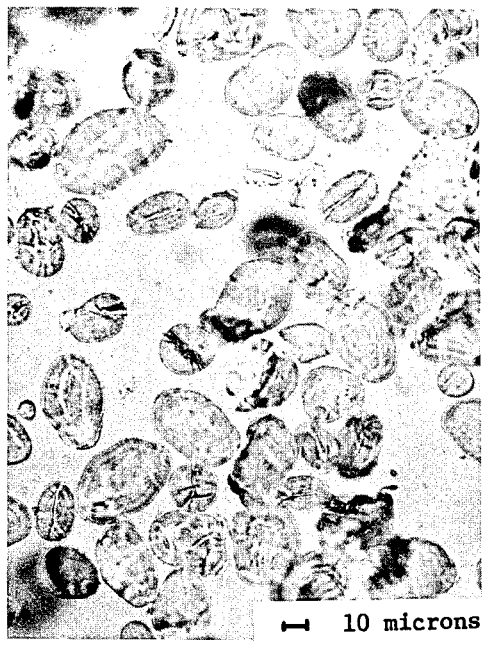

United States Patent [19]

Johnson

[11] 3,996,061
[45] Dec. 7, 1976

[54] STILT MATERIAL FOR PRESSURE SENSITIVE MICROENCAPSULATED COATINGS

[75] Inventor: Donald L. Johnson, Decatur, Ill.

[73] Assignee: A. E. Staley Manufacturing Company, Decatur, Ill.

[22] Filed: July 2, 1975

[21] Appl. No.: 592,450

Related U.S. Application Data

[63] Continuation-in-part of Ser. No. 477,951, June 10, 1974.

[52] U.S. Cl. .................................. 127/29; 106/22; 106/210; 106/308 C; 127/32; 127/33; 127/70; 127/71; 252/316; 536/106; 282/27.5; 428/306; 428/307; 428/323; 428/327
[51] Int. Cl.² .................. B01J 13/00; C13L 1/08; D21H 3/28
[58] Field of Search ............... 127/29, 32; 428/206, 428/207, 323, 327; 260/233 R; 106/22, 210, 308 C; 252/316

[56] References Cited
UNITED STATES PATENTS 3,825,467  7/1974  Phillips, Jr. .................. 428/213

OTHER PUBLICATIONS

"Starch: Chem. & Tech.", R. L. Whistler et al., eds., vol. I, 75, 81, Academic Press, New York, 1965.
J. A. Radley, "Starch and Its Derivatives", vol. II, 328–329, 330–331, John Wiley & Sons, New York, 1954.

*Primary Examiner*—Morris O. Wolk
*Assistant Examiner*—Sidney Marantz
*Attorney, Agent, or Firm*—Howard J. Barnett; Charles J. Meyerson

[57] ABSTRACT

Large diameter legume starch granules including starches derived from yellow field pea, *Pisum sativum* (var) and faba bean, *Vicia faba* L. (Leguminosae) which have been treated to remove protein and fiber, and to improve color are used to replace scarce arrowroot starch granules as a protective stilt material in microencapsulated coatings, including carbonless copy paper. The "stilt" material is used to prevent premature rupture of the microcapsules and early release of the microencapsulated materials. It has been discovered that the natural granule size, and other granule properties of the yellow field pea and faba bean starches are ideally suited to replace arrowroot starch granules as a protective material when the naturally occurring protein and fiber have been removed, and the color improved.

In certain coating processes in which the temperature at the coated surface exceeds the normal pasting temperature of these starch granules, the pasting temperature of the granules can be raised by a crosslinking reaction under temperature and pH conditions to preserve the granular structure of the starch particles. A polyfunctional crosslinking agent, such as epichlorohydrin, phosphorus oxychloride, sodium trimetaphosphate, acrolein, or urea formaldehyde can be used. Under high alkaline conditions, using phosphorus oxychloride in a stepwise reaction procedure, it is possible to increase the pasting temperature of the starch granules by more than 25° F.

These fiber and protein free, large diameter legume starch particles may also be used for other purposes, such as for anti-offset powders in lithography, either with or without crosslinking or other derivatization to further improve chemical and physical properties. These starches are also useful an absorbable dusting powders. The large granule starches derived from most varieties of peas and beans can be used in the same manner.

23 Claims, 2 Drawing Figures

⊢⊣ 10 microns

⊢⊣ 10 microns

⊢⊣ 10 microns

STILT MATERIAL FOR PRESSURE SENSITIVE MICROENCAPSULATED COATINGS

This application is a continuation-in-part of U.S. application Ser. No. 477,951 filed June 10, 1974.

BACKGROUND OF THE INVENTION AND PRIOR ART

Carbonless copy paper is disclosed in expired U.S. Pat. No. 2,711,375 issued to Robert W. Sandberg. This patent describes pressure-rupturable hydrophilic colloid material enclosing discrete liquid inclusions of an oily marking substance. The protective material used in this early coating was interlaced fibers of cellulose. Paper coating starch binder is disclosed as an optional ingredient. However, the cellulose fibers were considered as the "anti-smudge" means in this patent (column 2, lines 1–3 and lines 53–56).

U.S. Pat. No. 3,574,133 issued Apr. 6, 1971 to Bayless et al. discloses microencapsulated coatings, and makes reference to many related applications. The reference mentions that the microcapsule size ordinarily ranges from about 2–1,000 microns. This patent is primarily directed to the manufacture of the minute capsules, however, and does not add anything to the solution of the smudging problem. The capsule size and function would indicate that there was a problem in handling paper substrates coated with these capsules, too.

Another related patent application was filed by Robert Bayless and Donald Emrick on the same date as the above reference. U.S. Pat. No. 3,565,818 attempts to solve the premature rupture problem by chemically treating the capsule walls with certain transition metal salts to harden them and increase their rigidity.

Netherlands patent application No. 7,005,045 opened for public inspection on Oct. 12, 1970, describes the smudging problem with carbonless duplicating paper coatings in much more detail, and discloses the use of a "stilt" material which is distributed uniformly in the coating to protect the capsules from premature rupture while the coated paper is being handled. The particulate "stilt material" is uniformly distributed through the coating, and it is desirable that the stilt particles be a little larger than the microcapsules to give the best protection. The known stilt materials described in this Dutch patent application are: fine glass beads, short cellulose fibers, and starch grains. The starch grains are considered effective and inexpensive stilt materials, but only starch grains of the correct size are considered useful to protect the microcapsules. As a rule of thumb, this Dutch application suggests the starch particles should be 1.2 times the average size of the microcapsules. The Dutch reference lists the following starch granules as possible "stilt" materials:

| Type of Starch | Average Particle Size in Microns | FS | TI |
| --- | --- | --- | --- |
| arrowroot | 25–50 | 93 | 50 |
| potato | 15–100 | 88 | 48 |
| sago | 20–60 | 84 | 49 |
| wheat | 2–35 | 78 | 50 |
| tapioca | 5–35 | 78 | 54 |
| maize | 5–25 | 73 | 51 |
| rice | 3–8 | 64 | 52 |

Even though the above list is extensive, it does not include legume starches such as yellow field pea starch and faba bean starch. The above tabular summary includes values determined experimentally for the friction staining (FS) by coated papers containing the above stilt materials interspersed with ink containing microcapsules in the coatings. The tests are performed in a manner to simulate handling pressure applied to the coated paper samples, a value of 85 or more is considered desirable for the friction stain test, but it must be balanced by the requirement that a reasonable level of pressure should cause the capsules to rupture and form a copy image. The test devised to measure this value is referred to as the typewriter intensity (TI) test, and it is also described in the subject Dutch patent application No. 7,005,045. A TI value of 55 or less is considered good. It can be seen from the above tabular comparison, only arrowroot and potato starches exhibited the desired friction stain (FS) value in equilibrium with the desired typewriter intensity (TI) value. Sago starch was probably close enough to be considered, but as a practical matter, all three of the above starches are too costly or too scarce to be considered useful as a "stilt" material in microcapsule coatings. (See also Canadian Pat. No. 879,038). Potato starch granules are too large to be used.

U.S. Pat. No. 3,951,948 issued Apr. 20, 1976 having a common assignee herewith discloses a method and apparatus for physically separating a large granule starch stilt material from a starch having a large granule portion. The unwanted, interfering small granules are separated from the large granule portion by a means therein disclosed which has proven effective, but it adds processing cost to the stilt material.

SUMMARY OF THE INVENTION

New legume starches not disclosed in the subject Dutch patent have been discovered by me to be useful stilt materials having the required properties of particle size, TI and FS values. These new stilt materials include starches derived from certain species of legumes now being cultivated in the Great Plains provinces of Canada, where the cool climate is particularly suited for the growing of faba bean (*Vicia faba* L.) and yellow field pea, *Pisum sativum* (var). Both of these legumes produce starches having a particle size within the desired range for use as a stilt material.

This discovery was the result of an intensive search for a replacement for the very scarce arrowroot starch particles which, as illustrated above, had the most desirable particle size range of those starches contemplated by the applicants in Dutch patent application No. 7,005,045 filed Apr. 8, 1970 in the Netherlands (priority claimed from U.S. application Ser. No. 814,336 filed Apr. 8, 1969). The particle size of the starches derived from these legumes falls in the highly desirable range of from 20–75 microns. It is further expected that these starch particles will have an ideal balance of TI (typewriter intensity) value of 55 or less when tested according to the test procedure set forth in Dutch application No. 7,005,045 and an FS (friction stain) value of 85 or more.

The pasting temperature of these large granule starches can be increased as necessary to meet the higher temperatures used in at least one of the coating processes. The pasting temperatures may be increased by at least 20° F. by means of a highly alkaline, two step $POCl_3$ crosslinking process which retains the granular discrete particle structure of the starch. Other crosslinking agents which may be used for increasing the pasting temperature of these starches include epichlorohydrin, sodium trimetaphosphate, urea formaldehyde, mixed anhydrides (from adipic acid and acetic anhydride), and other polyfunctional crosslinkers.

The highly alkaline POCl₃ crosslinking process is presently preferred because it has a rapid reaction, and gives a substantial increase in pasting temperature. When yellow field pea starch was POCl₃ crosslinked according to the highly alkaline method, the pasting temperature (Kofler hot stage and DSC pasting temperature) was increased 20° F. in one test. The faba bean starch, crosslinked by the alkaline POCl₃ reaction, also showed an increase in Kofler hot stage and DSC pasting temperature of about 20° F. It is believed that this substantial increase in temperature stability obtained with both of these starches makes them ideally suited for carbonless paper coating processes in which the drying temperature in the coating reaches as high as 158° F., with complete retention of the protective function of the "stilt" starch particles.

The legume starches tested to date, including the yellow field pea and horse bean starches mentioned above, have been discovered to have an excessively high protein content which causes a shelf storage problem, and their color is not uniformly acceptable for carbonless paper coatings. In addition, the starch milling process leaves a relatively large amount of fiber, which also must be removed.

It has been found that the Gardner color index for the purified product should be less than about 9 to be acceptable, and the maximum acceptable remaining protein calculated at %N₂ should be no more than about 0.1, and preferably about 0.05 (Kjehdahl, 10–14% moisture starch).

The types of legume starches which are believed useful as stilt materials and for other applications, such as anti-offset lithograph powders, include:

ples and other varieties of legumes may have some different average granule sizes, with less or more large granules, and the actual size of the large granules observed in a particular starch can differ from sample to sample.

The above group of starches have not previously been used as stilt materials for carbonless paper and other microencapsulated coatings, to my knowledge, nor has this group of starches been used in anti-offset lithograph powders. As set forth more fully below, the starches are further treated in the manner indicated to remove fiber and protein. Removal of both fiber and protein has been found to be important, particularly when the starches are derived from yellow field pea (*Pisum sativum*) or faba bean (*Vicia faba* L.). The protein remaining with the starch after the starch has been milled creates an odor and a color problem, and the remaining fiber apparently interferes with effective coating in making carbonless copy paper. The presence of such protein is described in conjunction with faba bean starch in a recently published article. See: McEwen, et al. *A Scanning Electron Microscope Study of Fababean Seed*, Cereal Chemistry, V. 51, No. 6, pp. 750–757, at page 756, and FIG. 5, 1974.

DRAWINGS

Figure 2:
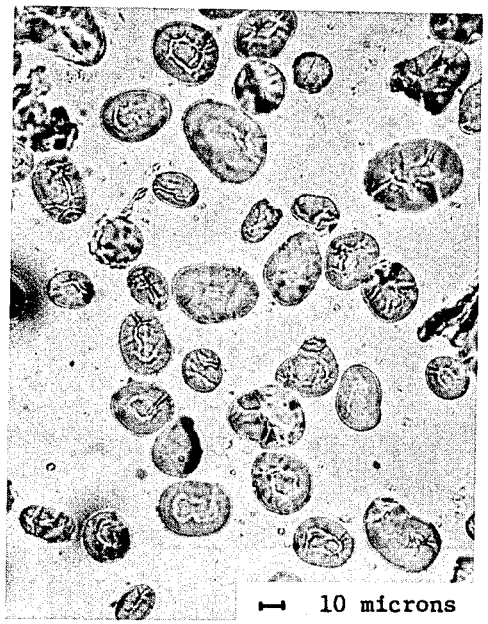

FIG. 1 of the drawings is a photomicrograph to the scale indicated (10 microns = ⅛ inch) showing starch granules of a variety of yellow field pea, *Pisum sativum* L. (Leguminosae) useful in the practice of this invention;

FIG. 2 of the drawings is a photomicrograph (10 microns = ⅛ inch) of starch granules of a variety of faba bean, *Vicia faba* . L. (Leguminosae) also useful for the practice of this invention.

As mentioned above, the milling process for the subject starches characteristically leaves a certain amount of protein and fiber with the granular starch, as can be seen in FIGS. 1 and 2 of the drawings. The fiber mate-

| Type of Plant Source | Average Starch Granule Size (Microns) | Largest Granule Size (Microns) |
|---|---|---|
| varieties of pea including the following: | | |
| yellow field pea, Pisum sativum varieties including Trapper var. 1973 and Century var. 1972 | 20–40 | 60 |
| shell pea, Pisum sativum convar. sativum, | 20–40 | 60 |
| Chickling pea, Lathyrus sativus L. (Leguminosae) | 15–30 | 45 |
| wrinkled pea, Pisum sativum var. (requires size classification) | 5–25 (bimodal) | at 25 |
| varieties of bean including the following: | | |
| faba bean, Vicia faba L. (Leguminosae) | 25–50 | 50 |
| common bean, Phaseolus vulgaris L. | 20–40 | 60 |
| French bean, Phaseolus (Leguminosae) | 20–40 | 60 |
| kidney bean, Phaseolus vulgaris, var. | 20–40 | 60 |
| runner bean, Phaseolus coccineus L. | 20–40 | 60 |
| lima bean, Phaseolus (Leguminosae) lunatus L. (Leguminosae) | 8–50 | 75 |
| adzuki bean, Phaseolus angularis [varieties including (Willd) W. F. Wright] | 30–65 | 90 |
| jack bean, Canavalia ensiformis (L.) DC (Leguminosae) | 20–40 | at 55 |
| cultivated vetch, Vicia sativa L. u.a. Arten (Leguminosae) | 20–35 | 55 |
| moon bean, Phaseolus lunatus var. | 20–50 | 75 |
| lentil, Lens esculenta (or L. culinaris) | 20–40 | at 55 |

NOTE: at = estimate

The average granule sizes set forth above are taken, in part from the literature, and in part from actual measurements. It must be appreciated that particular samrial appears as intergranular specks and shadows. The protein impurities are readily detected by the brownish color of the milled granular starch observed macroscopically and by a characteristic odor, which has curtailed acceptance of the milled granular starch without further refinement. It is believed that the protein and fiber removal also enhance the coating performance of the refined granular starch, when applied to carbonless copy paper as a protective stilt material.

The refined granular starch described herein has been successfully tested on carbonless copy paper, and is believed to give superior performance, both in anti-smudge tests, and in the FS and TI tests mentioned above. As can be seen in FIGS. 1 & 2, the starch granules are uniform-sized, spheroidal particles which have an overall appearance strikingly similar to that of arrowroot, now in short supply and relatively expensive.

The potential for increasing availability of these legume starches appears to be limited only by market potentials, because certain varieties of such crops may be grown in temperature climates throughout the world. Yellow field pea and faba bean, in particular, are now grown on the cool, high plains of west central Canada.

When used in pressure sensitive recording paper, the protective material should comprise about 1/15 up to one part per weight part of the solid content of the microcapsule dispersion, according to Matsukawa et al. (Canadian Pat. No. 879,038, issued Aug. 24, 1971). This latter reference also states that the suitable size range of the protective starch particles should be about 1.5 to 2 times the size of the microcapsules, which are reported to range in size from 3 to 20 microns.

The above starch granules of both starch types have an average size range of from 20 to 40 microns, some larger granules being about 55–60 microns in diameter. The granules are of a regular, generally spherical shape and are in the correct size range to be desirable anti-smudge "stilt" materials, particularly when incorporated as part of the microcapsule coating. These starch granules are also useful as lithographic anti-offset powders to prevent ink transfer from a freshly printed sheet to the back of an adjacent sheet.

EXAMPLE 1

Samples of starch derived from yellow field pea, *Pisum sativum* (var. Trapper 1973 and Century 1972) were tested for Kofler hot stage pasting temperature, and D.S.C. pasting temperature, following the procedure set forth below, following Example 3. Similar tests were run for starches derived from faba bean, *Vicia faba* L. (Leguminosae). All of the starch samples were obtained from starch manufacturers in Saskatchewan, Canada where these legumes are grown in increasing quantities because the cool, dry climate is particularly suited for these crops.

The test results are set forth below in tabular form:

| Type of Starch | DSC Pasting Temperature ° C. | | | Kofler Hot Stage ° C |
|---|---|---|---|---|
| | Start | Peak | End | |
| A. yellow field pea | 62 | 67 | 74 | 60 |
| B. faba bean | 62 | 67 | 73 | 60 |

When the above starches were POCl$_3$ crosslinked using the highly alkaline process and test procedures described in U.S. Pat. No. 3,876,629 issued Apr. 8, 1975, the Kofler hot stage pasting temperatures increased to 71° C. for crosslinked yellow field pea starch and 70° C. for crosslinked faba bean starch. This represents an increase in pasting temperature by means of the POCl$_3$ crosslinking of better than 18° F. These crosslinked products can be used in coating equipment which drys the coating at surface coating temperatures up to about 158° F. The alkali fluidity values for these crosslinked starches, following the test procedure set forth in U.S. Pat. No. 3,876,629 issued Apr. 8, 1975, and using 15 g. dry substance starch product, 25 ml. distilled water, 80 ml. 2N NaOH, were as follows:

| | | Alkali fluidity |
|---|---|---|
| A. | yellow field pea | 80 |
| B. | faba bean | 55 |

It does appear that the starches derived from faba bean will require some color improvement, as by bleaching, depending on the particular color requirements in use, and protein and fiber removal are also important.

The Coulter counts performed on the subject starches showed the following:

| Type of Starch | % Larger Than 10M | % Larger Than 20M | % Larger Than 30M |
|---|---|---|---|
| A. yellow field pea | 96 | 60 | 10 |
| B. faba bean | 100 | 55 | 5 |

EXAMPLE 2

Although the starches disclosed above have the desirable starch particle size, it has been discovered that they have relatively large amounts of protein and fiber, which can interfere with the use of these starches as stilt materials for pressure sensitive microencapsulated coatings. It has been found important to remove the protein and fiber from these large granule legume starches to obtain the required functionality, particularly when yellow field pea starch is used. For this purpose, the starches of Example 1 are subjected to additional processing as set forth below.

The yellow field pea starch of Example 1 was slurried in water to make a 30% solids suspension. A small amount of a dispersing aid, such as a nonionic surfactant (Pluronic L–61, Wyandotte Chemical Co., Wyandotte, Mich.) was added. The slurry was then screened through a 140 mesh screen to remove fiber, and the screen was washed with water. The screened material was then filtered with no added washing. The filter cake, containing about 46% by weight water was then reslurried with sufficient added water to make a 30% solids suspension. The pH was about 6.8, or nearly neutral.

The slurry was then treated with an amount of NaOCl which was sufficient to provide 2% by weight chlorine based on the starch dry substance to remove substantially all traces of protein from the screened and filtered starch slurry. During the chlorine treatment, the pH of the slurry dropped from about 10.5 to about 8.8. To stop the action of the chlorine, sodium metabisulfite was added to the slurry. The pH dropped further, down to about 5.3, and was then adjusted to nearly neutral with soda ash (Na$_2$CO$_3$). The slurry was then filtered and washed, and the filter cake was dired to about 9.8% moisture. The resulting large granule pea starch was substantially free of fiber and protein. The Gardner color index for this product was 7.6, and the Coulter count test revealed that at least 50% by weight of the granules were 27.5 microns in size, or larger. The resulting product was tested in a carbonless copy paper coating, and provided superior protection for the microencapsulated ink granules, as evidenced by handling tests (smudge value and friction staining). The improved protein and fiber free yellow field pea starch so obtained comprised about 87% by weight of the total weight of the unimproved starch from which it was prepared. The preferred Gardner Color Index should be below about 9, and the maximum acceptable percentage nitrogen (indication of protein) is about 0.1% by weight (Kjehldahl analysis) and the preferred maximum nitrogen is about 0.05% by weight.

EXAMPLE 3

Another sample of yellow field pea starch as described in Example 1 was subjected to the following additional processing to remove fiber and protein. These additional steps are preferably completed prior to any crosslinking, or other derivatization.

The yellow field pea starch was slurried at 30% solids and screened to remove all fiber as before, through a 140 mesh screen. The screened slurry was then filtered, reslurried at 30% solids, and refiltered. The filter cake was reslurried at 30% solids and the pH was adjusted to 4.0 with dilute HCl. About 0.03% by weight $KMnO_4$ in dilute solution was added to the slurry and reacted for about 1 hour with stirring. Then 0.18% by weight dry sodium metabisulfite was added to stop the oxidation. The slurry was neutralized with soda ash, filtered, washed and dried. The resulting product had a Gardner Color Value of 7.5 or less, and a $N_2$ analysis (Kjehldahl) of 0.12% by weight.

Other oxidation agents could be used, provided that the desirable granular structure, and the desirable Gardner Color Values are obtained. For example, hydrogen peroxide, sodium hypochlorite, chlorinated lime, and 1% sodium hydroxide with 0.5% NaOCl are all considered useful in varying degrees as oxidation agents to effectively remove the excess protein, and improve the color of the starch granules to a level acceptable for these stilt material containing coatings.

EXAMPLE 4

A sample of faba bean starch as described in Example 1 was subjected to the protein and fiber removal procedure outlined above in Example 2, with the exception that the pH was maintained in the range of 8.5–9.0 during the protein removal step for more effective protein removal. The additional procedures described in connection with Example 3 above can also be used, when indicated, on crude faba bean starch, as well as on other legume starches. Table I below shows the improvement obtained following the procedures set forth in Examples 2 and 4, respectively over the crude yellow field pea and faba bean starches described in Example 1.

TABLE I

| PEA | Gardner Color | % Nitrogen (dsb) | % Fiber |
|---|---|---|---|
| Ex. 1 (As received) | 20.0 | 0.59 | 0.57 |
| Ex. 2 (Processed) | 7.6 | 0.04 | 0.31 |
| FABA BEAN | | | |
| Ex. 1 (As received) | 23.7 | 0.56 | 3.98 |

TABLE I-continued

| PEA | Gardner Color | % Nitrogen (dsb) | % Fiber |
|---|---|---|---|
| Ex. 4 (Processed) | 3.0 | 0.013 | 0.31 |

As can be seen, the protein and fiber removal accomplishes substantial improvement in Gardner color, as well as reducing the protein and fiber to much more acceptable levels. The alkaline pH control increases the effectiveness of the protein and fiber removal even move, as illustrated by the data of Example 4.

The specific procedure followed to refine the crude faba bean starch is set forth below:

The protein remaining in the crude starch was removed first. About 219 g of starch, dry solids basis was slurried in about 600 g neutral tap water. The slurry pH was adjusted to 8.0–9.0 using 4% NaOH. The slurry was agitated for 30 minutes in a 1000 ml beaker, and the pH was measured at 8.3. The slurry was then filtered. The wet filter cake was then removed from the filter funnel and 407 g of wet filter cake was reslurried in water to provide 800 g of slurry at pH 8.3. The slurry was again stirred for an additional 30 minutes to extract remaining protein. The slurry was then filtered, the remaining solubilized protein passing through into the filtrate. The filter cake was then washed with 600 ml of water while still on the filter funnel. The filter cake was then reslurried, and screened to remove fiber. In this particular example, the slurry was first screened through a 100 mesh screen, then through a 140 mesh screen and finally recycled through a 230 mesh screen until the slurry is more white in color, indicating good fiber removal, even though some fiber remained in the filter cake when the screened product was filtered.

The screened filter cake was then bleached with chlorine as set forth below. The wet cake (144 g wet, and 79 g dry substance starch) was slurried with 320 g water. The pH was measured at about 8, and was then adjusted to 6.5. About 10.1 g of bleach (NaOCl) was added, initially raising the pH to 9.9. The slurry was then stirred for 2 hours to bleach the starch. The pH after about 40 minutes was 8.5. After about 1 hour and 45 minutes, the pH decreased to about 8.0, and one half hour later, the pH was about 7.8. Then 0.14 g of sodium metabisulfite was added to stop the bleaching action and the pH dropped to 6.0. After about 15 minutes of stirring, the pH increased to about 6.4 without any pH adjustment. The resulting refined product was then washed and dried. The refined starch so produced had excellent whiteness, and a low fiber level. The starch granules remained intact, and have ideal properties for use as a stilt material for carbonless copy paper coatings. It is also contemplated that the subject stilt materials can be used in other microencapsulated coatings such as microencapsulated perfume coated on paper substrates. Much the same handling protection is required for such coatings to avoid premature rupture of the microcapsules.

It has been found in practice that the protein extraction and fiber removal are more effective when the pH of the slurry is controlled, and held in the slightly alkaline range, or about pH 8–9. Care must be taken in all process steps to preserve the granular structure of the starch because this is the basis for the starch's function as a stilt material.

TEST PROCEDURE

Kofler Hot Stage Pasting Temperature

The Kofler hot stage pasting temperature is determined according to the following procedure. The method used is generally described in the following publication: Schoch, et al. *Microscopic Examination of Modified Starches*, Analytical Chemistry 28: 382–387 (1956). In this method, a Kofler electrically heated microscope stage is used to heat a drop of an 0.1–0.2% suspension of the starch on a microscope slide. The heating rate is adjusted to about 2° C. per minute, and the granules are observed during the heating with normal and with polarized light. Using normal light, the pasting of a granule can be noted by the change in shape and size as it begins to swell. The loss of birefringence evidenced by the loss of the polarization cross is observed with polarized light. The granules paste over a range of temperature, and the temperature at the instant when 50% of the granules in the field of the microscope are estimated to have lost their polarization crosses is recorded, and is defined as the pasting temperature for purposes of this test.

ALKALI FLUIDITY TEST PROCEDURE

A half gallon of slurry was adjusted to a pH of 4–7 with 20° Be. hydrochloric acid. The starch cake sample to be tested was first filtered and washed with one quart of water, then 500 grams of the starch cake was reslurried in 280 ml. of water at 75°–80° F., and adjusted to 19.5°–20.5° Be. with additional starch cake or water at about 75°–80° F. The slurry sample containing 20 grams dry substance starch was placed in a fluidity beaker, and 70 ml. of 2.0N NaOH was added. The mixture was stirred for 3 minutes and immediately after stirring, an alkali fluidity reading was taken using a standardized fluidity funnel. The fluidity funnel used should have a "water-time" between about 30 to 40 seconds. "Water-time" is the total elapsed time required to pass 100 ml. of pure water through the fluidity funnel, and is checked before the beginning of each test.

To conduct the alkali fluidity test, the alkaline starch suspension is placed in the fluidity funnel and the amount of starch solution which flows through the funnel during the "water-time" is measured and recorded in milliliters. The funnel is thoroughly washed prior to each test to insure accurate observations.

The alkali fluidity test is presently believed to be the most practical means for controlling the degree of crosslinking of the starch. The test is generally described in U.S. Pat. No. 3,238,193 at columns 7 and 8, lines 40–61 and 1–9 respectively. The basic principle followed is to compare the fluidity of the sample to the fluidity of water as a standard. There are, of course, variations in the particular starch sample concentrations, and only samples of the same starch concentration can be directly compared to each other. For example, if a starch sample is quite thick when pasted, a smaller amount will be used in proportion to the amount of water it is mixed with so that a middle or higher than middle range figure will be obtained (50 ml. or more, up to about 90 ml.).

The fluidity funnel used for the alkali fluidity tests described herein comprises two main parts, a funnel body and a funnel tip threadably attached thereto. A simple plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone shaped vessel having a sixty degree angle (or taper) between opposite, converging funnel walls. Funnel body height is sufficient to hold at least a 100 ml. sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the "water-time" of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inches in length. The total height for the lower end of the funnel body passage to the lower external orifice of the funnel tip includes the height of the ball chamber (0.1008 inches) and the length (0.0492 inches) of the funnel tip opening.

Since many embodiments of this invention may be made and since many changes may be made in the embodiments described, the foregoing is interpreted as illustrative and the invention is defined by the claims appended hereafter.

What is claimed is:

1. A protective material disposed between adjacent surfaces to prevent transfer of a chromogenic substance therebetween, said protective material comprising refined large diameter starch granules derived from legume sources selected from the group consisting of yellow field pea, shell pea, Chickling pea, wrinkled pea, faba bean, varieties of common bean, French bean, kidney bean, runner bean, lima bean, adzuki bean, jack bean, cultivated vetch, moon bean and lentil, said starch granules being substantially free of all protein and fiber residue, said starch granules having an average size ranging from about 20–75 microns, and having a friction staining value of at least 85 and a typewriter intensity value of 55 or less, said starch granules having been further modified either physically or chemically, or both, to improve physical properties including decrease in odor, improvement in color and removal of non-starch materials from the granules to adapt such granules for use as a protective material.

2. The protective material of claim 1, in which the refined starch granules are derived from faba bean, varieties of common bean, French bean, kidney bean, runner bean, lima bean, adzuki bean, jack bean, cultivated vetch, moon bean and lentil.

3. The protective material of claim 1, in which the refined starch granules are derived from lentil.

4. In an anti-offset powder for preventing transfer between freshly printed lithographic sheets, the protective material of claim 1.

5. In a carbonless copy paper having a microencapsulated chromogenic substance coating on one surface thereof, the protective material of claim 1 uniformly dispersed in said coating.

6. The protective material of claim 1, in which the refined starch granules are derived from a plant source selected from the group consisting of varieties of pea including the following: yellow field pea, shell pea, Chickling pea and wrinkled pea.

7. The protective material of claim 2, in which the plant source from which the starch is derived is selected from the group consisting of yellow field pea and faba bean, and in which the starch granules have been further treated to remove protein and fiber.

8. The protective material of claim 7, in which the refined starch granules are interspersed in a coating of microcapsules between adjacent surfaces to prevent rupture of the microcapsules until said coating is subjected to an impact force equivalent to a typewriter intensity value no more than 55.

9. The protective material of claim 8, in which the refined starch granules are derived from faba bean which has been bleached.

10. The protective material of claim 8, in which the refined starch granules are derived from yellow field pea.

11. A protective material disposed between adjacent surfaces to prevent transfer of a chromogenic substance therebetween, said protective material comprising refined large diameter starch granules derived from legume sources selected from the group consisting of yellow field pea, shell pea, Chickling pea, wrinkled pea, faba bean, varieties of common bean, French bean, kidney bean, runner bean, lima bean, adzuki bean, jack bean, cultivated vetch, moon bean and lentil, said starch granules being substantially free of all protein and fiber residue, said starch granules having an average size ranging from about 20–75 microns, and having a friction staining value of at least 85 and a typewriter intensity value of 55 or less, said starch granules having been further modified either physically or chemically, or both, to improve physical properties including decrease in odor, improvement in color and removal of non-starch materials from the granules to adapt such granules for use as a protective material, and in which the starch granules are modified by means of a polyfunctional crosslinking agent.

12. In a method of making a carbonless copy paper including a microencapsulated chromogenic substance coated on one surface thereof, the step of incorporating in said coating a protective material comprising the refined large diameter starch granules derived from legume sources selected from the group consisting of yellow field pea, shell pea, Chickling pea, wrinkled pea, faba bean, varieties of common bean, French bean, kidney bean, runner bean, lima bean, adzuki bean, jack bean, cultivated vetch, moon bean and lentil, said starch granules being substantially free of all protein and fiber residue.

13. The method of claim 12, in which the refined starch granules are derived from yellow field pea, and including the further steps of washing said starch granules to remove odor causing protein residues, and physically treating said granules to remove all remaining fibers.

14. The method of claim 12, in which the starch granules are derived from faba bean.

15. A protective material for use in microencapsulated coatings to prevent prerupturing the microcapsules, said protective material comprising large diameter, refined starch granules derived from legume sources selected from the group consisting of yellow field pea, shell pea, Chickling pea, wrinkled pea, faba bean, varieties of common bean, French bean, kidney bean, runner bean, lima bean, adzuki bean, jack bean, cultivated vetch, moon bean and lentil, said starch granules being substantially free of all protein and fiber residue, said granules having an average size ranging from about 20–75 microns, and said refined starch granules have a maximum protein residue calculated as percent nitrogen of no more than about 0.1% by weight based on the total weight of the starch granules at 10–14% moisture, said refined starch granules having been obtained by washing and filtering crude starch granules.

16. The protective material of claim 15, in a carbonless copy paper coating, said starch granules being uniformly interspersed with said microcapsules to provide a carbonless copy paper having a friction staining value of at least 85, and a typewriter intensity value of no more than 55.

17. The protective material of claim 15, in which the refined starch granules include less than about 0.5% by weight fiber based on the total weight of the starch granules containing about 10–14% moisture.

18. The protective material of claim 15, in which the percent nitrogen is less than about 0.5%.

19. The protective material of claim 15, in which the refined starch granules are selected from the group consisting of yellow field pea, shell pea, Chickling pea, wrinkled pea, faba bean, varieties of common bean, French bean, kidney bean, runner bean, lima bean, adzuki bean, jack bean, cultivated vetch, moon bean and lentil.

20. The protective material of claim 19, in which the refined starch granules include less than about 0.5% by weight fiber based on the total weight of the starch granules containing 10–14% moisture.

21. The protective material of claim 15, in the refined starch granules are selected from the group consisting of yellow field pea and faba bean.

22. The protective material of claim 21, in which the refined starch granules include less than about 0.5% by weight fibrous material based on the total weight of the starch granules at 10–14% moisture.

23. The protective material of claim 22, in which the starch granules have a Gardner color index of at least 9.

* * * * *